(12) United States Patent
Gofman et al.

(10) Patent No.: US 7,876,765 B2
(45) Date of Patent: Jan. 25, 2011

(54) METHOD FOR SUPPORTING IP NETWORK INTERCONNECTIVITY BETWEEN PARTITIONS IN A VIRTUALIZED ENVIRONMENT

(75) Inventors: Sergei Gofman, Haifa (IL); Lenz Oron, Hof HaCarmel (IL); Jeff Jackson, Newberg, OR (US)

(73) Assignee: Intel Corporation, Santa Clara, CA (US)

( * ) Notice: Subject to any disclaimer, the term of this patent is extended or adjusted under 35 U.S.C. 154(b) by 1139 days.

(21) Appl. No.: 11/541,122

(22) Filed: Sep. 29, 2006

(65) Prior Publication Data

US 2008/0080512 A1   Apr. 3, 2008

(51) Int. Cl.
    *H04L 12/56*    (2006.01)
    *G06F 15/16*    (2006.01)
    *G06F 15/173*   (2006.01)
(52) U.S. Cl. .................. 370/395.53; 709/236; 709/238
(58) Field of Classification Search .................. 370/389, 370/395.53; 709/236, 238
    See application file for complete search history.

(56) References Cited

U.S. PATENT DOCUMENTS

| | | | | |
|---|---|---|---|---|
| 7,171,492 | B1* | 1/2007 | Borella et al. ............... | 709/245 |
| 2003/0069993 | A1 | 4/2003 | Na et al. | |
| 2004/0052216 | A1 | 3/2004 | Roh | |
| 2004/0078483 | A1* | 4/2004 | Simila et al. ................ | 709/238 |
| 2004/0083481 | A1* | 4/2004 | Shultz et al. ................ | 719/312 |
| 2006/0126622 | A1* | 6/2006 | Park et al. ................... | 370/389 |
| 2006/0129676 | A1* | 6/2006 | Modi et al. .................. | 709/227 |
| 2006/0187928 | A1* | 8/2006 | McGee et al. ............... | 370/390 |
| 2007/0150564 | A1* | 6/2007 | Eldar et al. .................. | 709/223 |
| 2007/0171904 | A1* | 7/2007 | Tchigevsky ................. | 370/389 |
| 2008/0002663 | A1* | 1/2008 | Tripathi et al. .............. | 370/351 |
| 2008/0022388 | A1* | 1/2008 | Grewal et al. ................ | 726/13 |

FOREIGN PATENT DOCUMENTS

WO    WO-2007040482    4/2007

OTHER PUBLICATIONS

"42P24279GB Exam Report Mailed Jan. 11, 2008 for GB Patent Application 0719017.6", (Jan. 11, 2008), Whole Document.
"Non Final Office Action for Korean Patent Application No.: 10-2007-98479 dated Aug. 24, 2009", Whole Document.
"Office Action for Chinese Application No. 200710305788.7", (Jun. 12, 2010), Whole Document.
"Office Action for Netherlands Patent Application No. NL 1034452", (Nov. 17, 2009), Whole Document.

* cited by examiner

*Primary Examiner*—Man Phan
*Assistant Examiner*—Ryan C Kavleski
(74) *Attorney, Agent, or Firm*—Blakely, Sokoloff, Taylor & Zafman LLP (57) ABSTRACT

A method for preventing loopback of data packets sent between entities residing on a single host. In one embodiment, an auxiliary address shared among entities residing on the host indicates that a data packet is to be routed to an entity residing on the host. In another embodiment, a source address and a target address in a data packet header are switched while being routed to a target entity residing on the host.

26 Claims, 7 Drawing Sheets

METHOD FOR SUPPORTING IP NETWORK INTERCONNECTIVITY BETWEEN PARTITIONS IN A VIRTUALIZED ENVIRONMENT

BACKGROUND OF THE INVENTION

1. Field of the Invention

The invention relates generally to network connectivity for guest entities existing on a shared host. More particularly, embodiments of the invention enable network connectivity for entities without implementing network address translation.

2. Background Art

There are several commercial virtualization environments such as VMWARE® and MICROSOFT® VITRUALPC®. These environments allow multiple guest entities running on a single host, wherein each guest entity can establish a network connection with the outside network and with other entities using an Internet Protocol (IP) or similar protocol. To support connectivity between entities, these environments typically assign one or more addresses to the entities, and resolve data transfers involving the entities via network address translation (NAT).

In a virtualized environment, NAT relies on the host machine having its own Media Access Control (MAC) and Internet Protocol (IP) addresses, usually assigned by a Dynamic Host Configuration Protocol (DHCP) server in the network. The host machine sets up its own internal network, wherein each guest entity may be assigned internal MAC and IP addresses. When a connection is needed to send a data packet from one guest entity to a target external to the host machine, the connection may be assigned to a port on the host to distinguish it from other connections. Before the packet is sent to the outside network, the internal MAC and IP addresses of the source entity may be replaced in the data packet with the MAC and IP addresses of the host, the checksum recalculated and the translation recorded in a translation table so that the return packet can be routed to the correct entity.

When a data packet is returned on a specific port, the packet's target may be looked up in a translation table and the internal MAC and IP addresses of the target entity are replaced in the data packet. After replacing the addresses, the checksum is again recalculated before forwarding the packet to its target entity. When a connection on the host is closed, the entry in the translation table is deleted. For connections solely between two entities residing on the host, data packets are forwarded without the need to modify the addresses or checksum value.

The NAT has several limitations. It has to fix addresses for each and every outbound or inbound data packet, and recalculate checksum accordingly. Usually the NAT in an internal network resides on the router, so its effect on the system performance is minimal. In a virtualized environment, however, it is implemented in software which runs on the host and consumes significant system resources. NAT also breaks some end-to-end protocols such as Virtual Private Network (VPN) tunnels that use the authentication header for verification. Furthermore, users of a guest entity will not be able to see or use their "real", i.e. public, IP address for troubleshooting purposes.

When two (or more) guest entities use port routing to divide network traffic between them, each is assigned a range of ports and all traffic in that range is assigned to that guest entity. In port routing, packets from one guest entity cannot be sent to another guest entity since it will have the same MAC and IP in both the source and the target fields of its Ethernet header. This is called a loopback packet and some intermediate drivers will block such packets from going to the miniport, by reverting them to the network stack. This limits the capabilities of the system since, for example, if the service operating system (OS) has a web based configuration page, so one can configure the machine behavior with it, it will only be accessible from an external computer and not from the capability OS.

BRIEF DESCRIPTION OF THE DRAWINGS

The various embodiments of the invention are illustrated by way of example, and not by way of limitation, in the figures of the accompanying drawings and in which.

DETAILED DESCRIPTION

Techniques and architectures for enabling network connectivity for entities sharing a single host are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions which follow are presented in terms of algorithms and symbolic representations of operations on data bits within a computer memory. These algorithmic descriptions and representations are the means used by those skilled in the networking arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the invention is not described with reference to any particular programming language. It will be appreciated that a variety of programming languages may be used to implement the teachings of the invention as described herein.

A method and apparatus is described for enabling network connectivity for entities residing on a single host without implementing network address translation. One embodiment enables several guest entities, using individual IP addresses while sharing a single MAC address, to establish network communication while protecting system performance and end-to-end connectivity. In such an embodiment, all of the entities on the system will use the single true MAC address of the network interface card (NIC), and acquire individual IP addresses from the DHCP using, for example, the option 61 client identification field described in the Request for Comments (RFC) 1533 of the Network Working Group, issued October 1993. Option 61 is a field in the DHCP request that was added to allow multiple clients using the same MAC address to receive different IP addresses. When using this feature, the DHCP will assign IP addresses based on the MAC address and the user identification (instead of the MAC only). This will allow all the entities to establish network connections with the outside network without any translation in any way.

Another embodiment enables network communication between several guest entities without using NAT, wherein said guest entities share both a single IP addresses and a single MAC address. Such an embodiment extends to cases where a DCHP server does not support utilities such as option 61. Without the availability of option 61, the entities are forced to use port routing to enable network communications while sharing both MAC and IP addresses. Port routing, in general, divides the traffic between the entities based on ports, which limits the interconnectivity between the entities. Various embodiments extend interconnectivity between two guest entities in a shared host environment.

Figure 1:
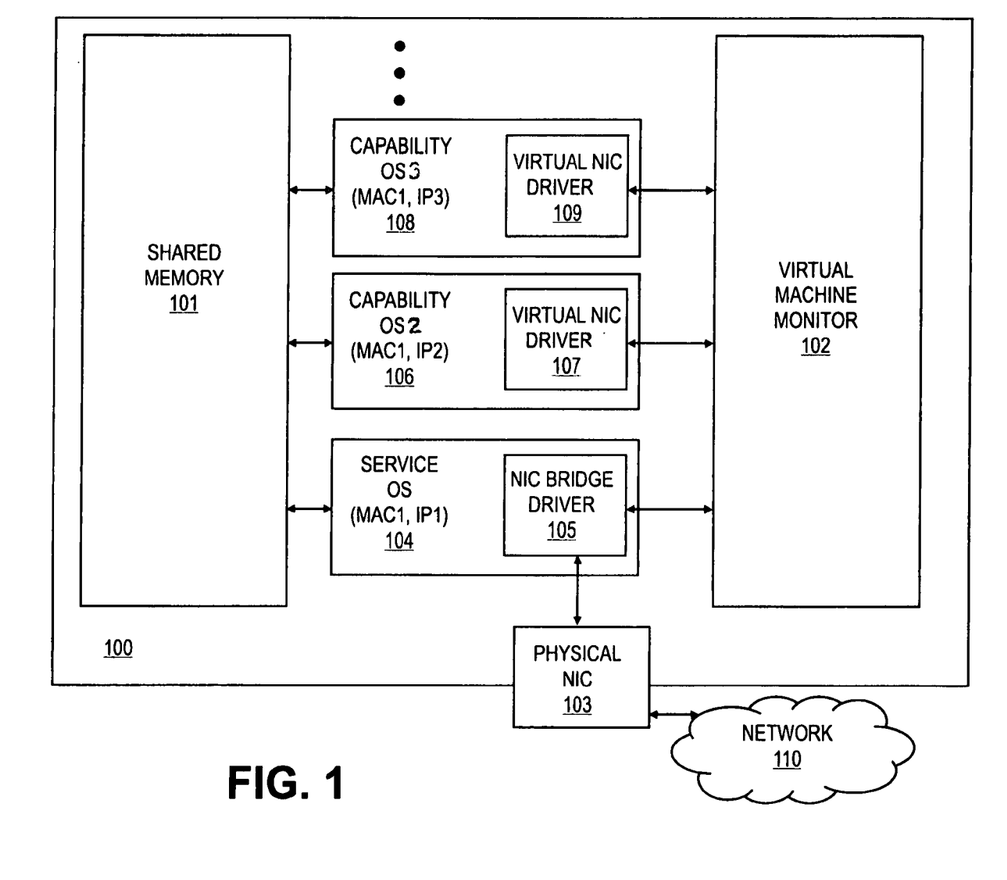
FIG. 1 is a schematic diagram illustrating a host with multiple entities sharing a common MAC address.
Figure 2:
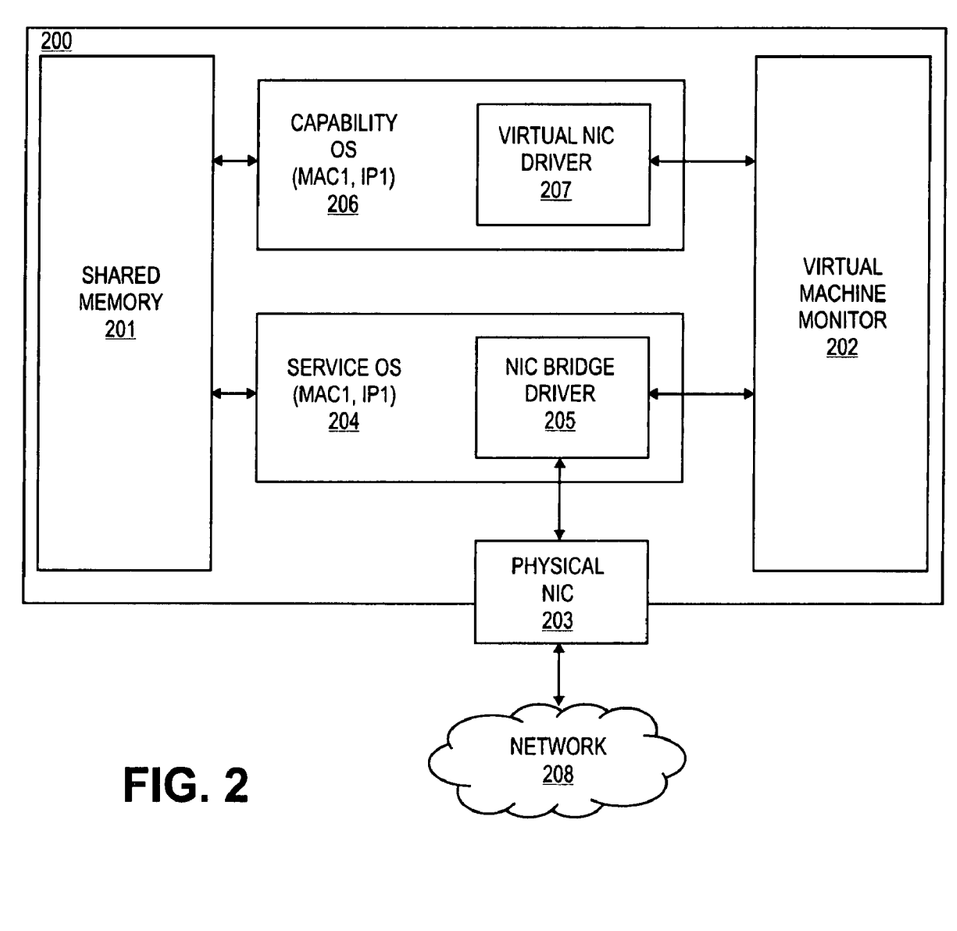
FIG. 2 is a schematic diagram illustrating a host with multiple entities sharing both a common MAC address and a common IP address.

FIGS. 1 and 2 show exemplary host configurations wherein an embodiment may be practiced. Regarding FIG. 1, multiple guest entities—in this case a service OS 104 and a number of capability OSs 106, 108—are shown running on the same host machine 100. It is known in the art that other types of entities, e.g. hardware virtual machines, software virtual machines, partitions and VPN clients, can substitute the operating systems shown in FIG. 1. A service OS 104 controls the physical NIC 103 via a NIC bridge driver 105, and the capability OSs 106, 108 each have their respective virtual NIC drivers 107, 109. The NIC drivers 105, 107, 109, are used to communicate with a virtual machine monitor 102 supporting the multiple entities on the host 100. The routing of data packets to and from the host, and of data packets sent within the host between guest entities, may be serviced at the host 100, in this case by the NIC bridge driver 105 of the service OS 104. The NIC bridge driver 105 may service the routing of data packets by controlling an interface device, in this case a physical NIC 103, to allow communication between the host 100 and a network 110. It is known in the art that various modems or other interface devices can substitute the physical NIC 103 shown. It is further known in the art that the host may interface with single machine or an alternative system other than a network. Each of service OS 104, capability OS1 106 and capability OS 108 may also be in communication with a shared memory 101 of the host 100.

In FIG. 1, the guest entities may all share a single MAC address (MAC1) while having their own individual IP addresses (IP1, IP2, IP3, etc.). This particular address sharing may be used by the host 100, for example, in an Open Systems Interconnection (OSI) layer 3 routing mode. The single MAC address shared by the guest entities may be the real MAC address of the interface device, e.g. the physical NIC 103. The individual IP addresses may be assigned to their respective guest entities by way of a DHCP server which supports the option 61 client identification field.

Regarding FIG. 2, a host configuration similar to that of FIG. 1 is shown. In this case a service OS 204 and a capability OS 206 are shown running on the same host machine 200. It is known in the art that other types of entities, e.g. hardware virtual machines, software virtual machines, partitions and VPN clients, can substitute the operating systems shown in FIG. 1. A service OS 204 controls the physical NIC 203 via a NIC bridge driver 205, and the capability OS 206 includes a virtual NIC driver 207. The NIC drivers 205, 207 may communicate with a virtual machine monitor 202 supporting the multiple entities on the host 200. The routing of data packets to and from the host, and of data packets sent within the host between guest entities, may be serviced at the host 200, in this case by the NIC bridge driver 205 of the service OS 204. The NIC bridge driver 205 may service the routing of data packets by controlling an interface device, in this case a physical NIC 203, to allow communication between the host 200 and a network 208. It is known in the art that various modems or other interface devices can substitute the physical NIC 203 shown. It is further known in the art that the host may interface with single machine or an alternative system other than a network. The service OS 204 and capability OS1 206 may also be in communication with a shared memory 201 of the host 200. In addition to sharing a single MAC address as in the example of FIG. 1, the guest entities 204 and 206 on the host 200 further share a single IP address IP1. This sharing of a single IP address might occur, for example, when the host cannot locate a DHCP server capable of supporting the option 61 field in a DHCP request. In sharing both a single MAC address and a single IP address, the host may have to use port routing to transmit data packets between the guest entities.

For either of the configurations shown in FIGS. 1 and 2, a guest entity may try to send a data packet to another guest entity. When eliminating the use of NAT or otherwise sharing an address among the guest entities, the structure of the header or headers in which this data packet is encapsulated may give rise to a loopback problem. As discussed below, the type of header determines the extent of the loopback problem.

Figure 3:
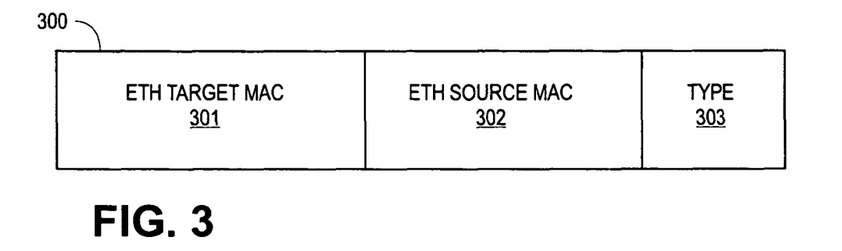
FIG. 3 is a data frame diagram illustrating part of the structure for an Ethernet data packet.

FIG. 3 shows part of an exemplary networking header 300 which, according to one embodiment, encapsulates a data packet sent between two guest entities. Specifically, an ethernet (ETH) header 300 is shown, comprising an ETH target MAC field 301 to specify a data packet recipient entity, an ETH source MAC field 302 to specify the entity sending the data packet, and a type field 303 to identify the network protocol being used. In various embodiments, the data packet may be compliant with the Institute of Electrical & Electronics Engineers (IEEE) 802.1AE standard. In one embodiment, each data packet sent by a guest entity may be encapsulated at least by a networking header. It is understood in the art that one of a variety of protocols may be used in encapsulating data packets in a networking header.

Figure 4:
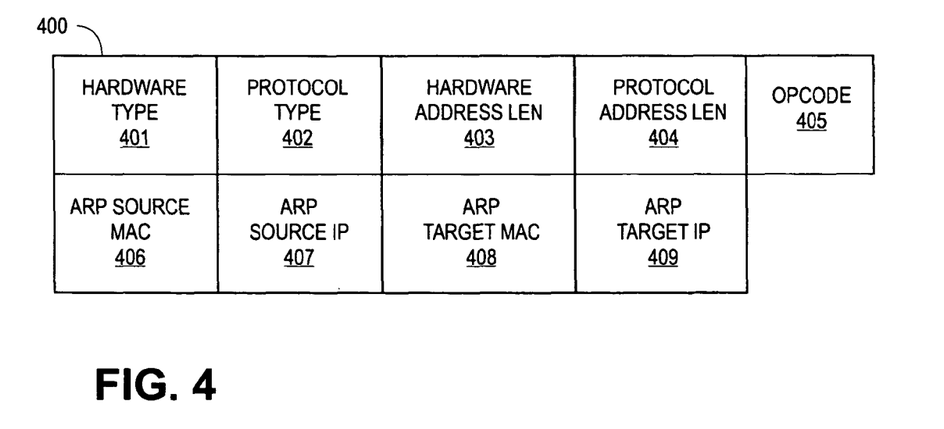
FIG. 4 is a data frame diagram illustrating part of the structure for an address resolution data packet.

Some data packets transmitted between guest entities may be further encapsulated in headers containing both source and target MAC address fields and source and target IP address fields. FIG. 4 shows an example of one such header—an address resolution protocol (ARP) header 400 such as that described in "An Ethernet Address Resolution Protocol", Request For Comments (RFC) No. 826 of the Network Working Group, published November 1982. When an entity has only an IP address for another entity, the entity may send an ARP request for the hardware address of the other entity, which in turn may result in the receipt of an ARP reply from the other entity. Both an ARP request data packet and an ARP reply data packet may be encapsulated in an ARP header 400.

A typical ARP header 400 may comprise: a hardware type field 401 to describe the type of MAC address which is being mapped, a protocol type field 402 to describe the type of protocol address to which the MAC address is mapped, a hardware address len field 403 to describe the length of the MAC address, a protocol address len field 404 to describe the length of the protocol address, an opcode field 405 to indicate whether the data packet is an ARP request or an ARP reply, an ARP source MAC field 406 to hold the MAC address of the entity sending the data packet, an ARP source IP field 407 to hold the IP address of the entity sending the data packet, an ARP target MAC field 408 to hold the MAC address of the entity to receive the data packet, and an ARP target IP field 409 to hold the IP address of the entity to receive the data packet.

Figure 5A:
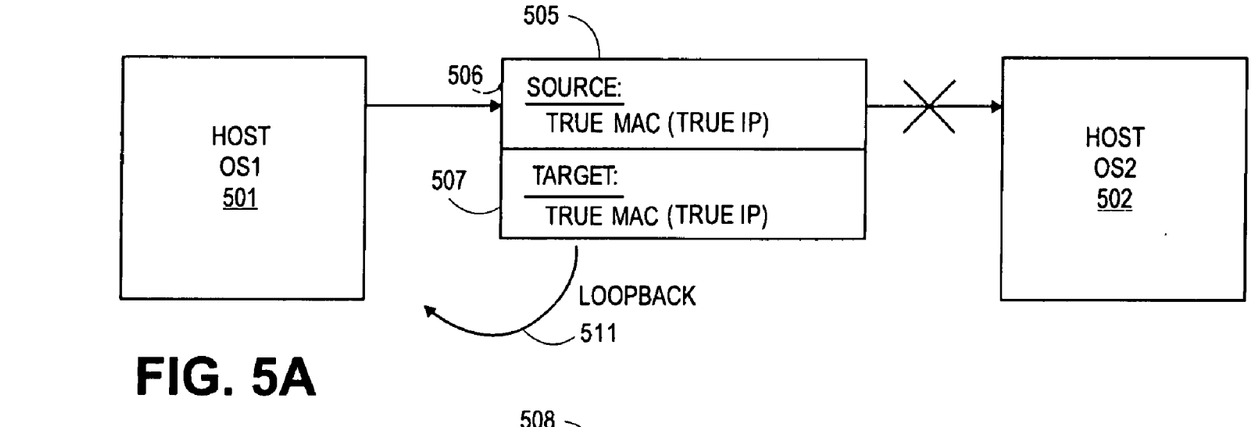
FIG. 5A is a block diagram illustrating loopback of a data packet between entities on a single host.

FIG. 5A illustrates a common loopback problem in transmitting data packets between guest entities residing on a shared host. In this example a guest entity residing on host, host OS1 501, attempts to send a data packet to a second entity on the same host, host OS2 502. For simplicity, FIG. 5A shows only the header 505 which encapsulates the data packet. The header 505 may include source information 506, which includes at least a source MAC address field, and target information 507, which includes at least a target MAC address field. The source MAC address field in the source information 505 may correspond to the ETH source MAC field 302 in the case of a network header, or to the ARP source MAC field 406 in the case of an ARP header. The target MAC address field in the target information 507 may correspond to the ETH target MAC field 301 in the case of a network header, or to the ARP target MAC field 408 in the case of an ARP header. Where the encapsulating header 505 is an ARP header, the source information 506 and target information 507 may further include, respectively, an IP address field corresponding to the ARP source IP field 407, and an IP address field corresponding to the ARP target IP field 409. The IP address information in the header 505 is shown in parentheses to demonstrate that certain embodiments may be implemented for types of headers which do not encapsulate the data packet with source and target IP information.

When the encapsulated data packet is sent from host OS1 501, an intermediate device on the host may intercept the data packet and process it for transmission to host OS2. This intermediate device may be the NIC bridge driver 105 or a similar host device designated for the task. Loopback may occur when the intermediate device sees that some source address information and its corresponding target information are the same. For example, if only a single MAC address is shared by host OS1 501 and host OS2 502, and the data packet 505 is encapsulated in ethernet header 300, the ETH source MAC address field 301 and the ETH target MAC address field would both have the single MAC address. This would cause transmission of the data packet to host OS2 502 to fail, in favor of a loopback 511 to host OS1 501.

In cases where the data packet is further encapsulated with an ARP header, for example, such a header may contain a second basis for the intermediate device to loopback the data packet. For example, if host OS1 501 and host OS2 502 both share only a single MAC address and a single IP address, and the data packet 505 is further encapsulated in an ARP header 400, the ARP source MAC field 406 and ARP target MAC field 408 may both have the shared single MAC address, and the ARP source IP field 407 and ARP target IP field 409 may both have the shared single IP address. This may constitute a separate basis, separate from that of the network header, for the transmission of the data packet to host OS2 502 to fail, in favor of a loopback 511 to host OS1 501.

For example, when host OS1 501 and host OS2 502 share as a single MAC address the true MAC address of the interface device of the host machine, a header encapsulating the data packet—such as ethernet header 300—may have that single MAC address in both the ETH target MAC address field 301 and in the ETH source MAC address field 302. The single MAC address shared by the guest entities may be the real MAC address of the interface device, e.g. the physical NIC 103.

Figure 5B:
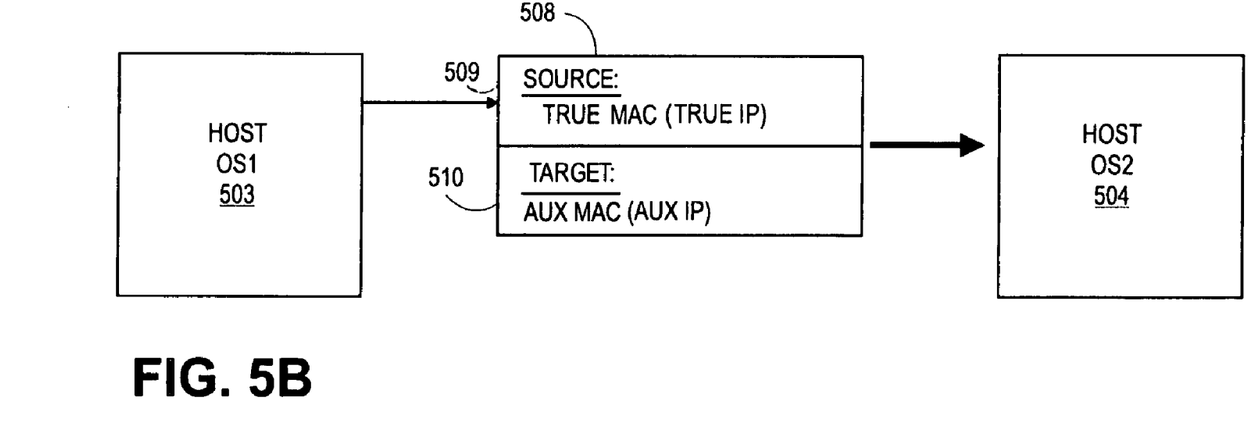
FIG. 5B is a block diagram illustrating the transmission of a data packet between entities residing on a single host.

FIG. 5B illustrates a solution to the loopback problem of FIG. 5A, according to one embodiment. In this example a guest entity residing on host, host OS1 503, may attempt to send a data packet to a second entity on the same host, host OS2 504. For simplicity, FIG. 5B shows only one header 508 which encapsulates the data packet. The header 508 may include source information 509, which includes at least a source MAC address field, and target information 510, which includes at least a target MAC address field. The source MAC address field in the source information 508 may correspond to the ETH source MAC field 302 in the case of a network header, or to the ARP source MAC field 406 in the case of an ARP header. The target MAC address field in the target information 510 may correspond to the ETH target MAC field 301 in the case of a network header, or to the ARP target MAC field 408 in the case of an ARP header. Where the encapsulating header 508 is an ARP header, the source information 509 and target information 510 may further include, respectively, an IP address field corresponding to the ARP source IP field 407, and an IP address field corresponding to the ARP target IP field 409. To represent this possibility, FIG. 5B shows IP address information of the header 508 in parentheses.

In order to enable full network traffic between the two entities, an embodiment may use auxiliary addresses, either auxiliary MAC addresses or auxiliary IP addresses, or both. Each entity knows the IP address of the other entities. This information may be communicated by any of a number of means, such as via the shared memory. Each entity further knows that its own MAC address is the MAC address of the interface, e.g. the physical NIC. When a source entity residing on the host is sending a data packet to a target entity residing on the host, the auxiliary address may be stored in a target field—either a target MAC field or a target IP field, or both—so that loopback will not be caused by an encapsulating header of the data packet having identical target and source addresses.

The source entity on the host may put a generic (a.k.a. auxiliary) MAC address in the target MAC address field of the IP packet sent to a target entity residing on the same host. The entities residing on the host may all use the same auxiliary MAC address for sending IP packets among one another. The result is that each entity on the host appears to other entities on the host as having a different MAC then what they really have, which prevents loopbacks due to the use of identical source and target MAC addresses. A similar use of an auxiliary IP address will prevent loopback due to the use of identical source and target IP addresses in a data packet.

In the example of FIG. 5B, the header 508 has the auxiliary MAC address stored as target information 510. This prevents loopback based on identical MAC addresses. If header 508 is of a type which also stores an IP address as target information 510, then the host OS1 503 will also include an auxiliary IP address which prevents loopback based on identical IP addresses in the header 508. The details of how one embodiment takes advantage of auxiliary addresses in data packet headers is described below.

Figure 6:
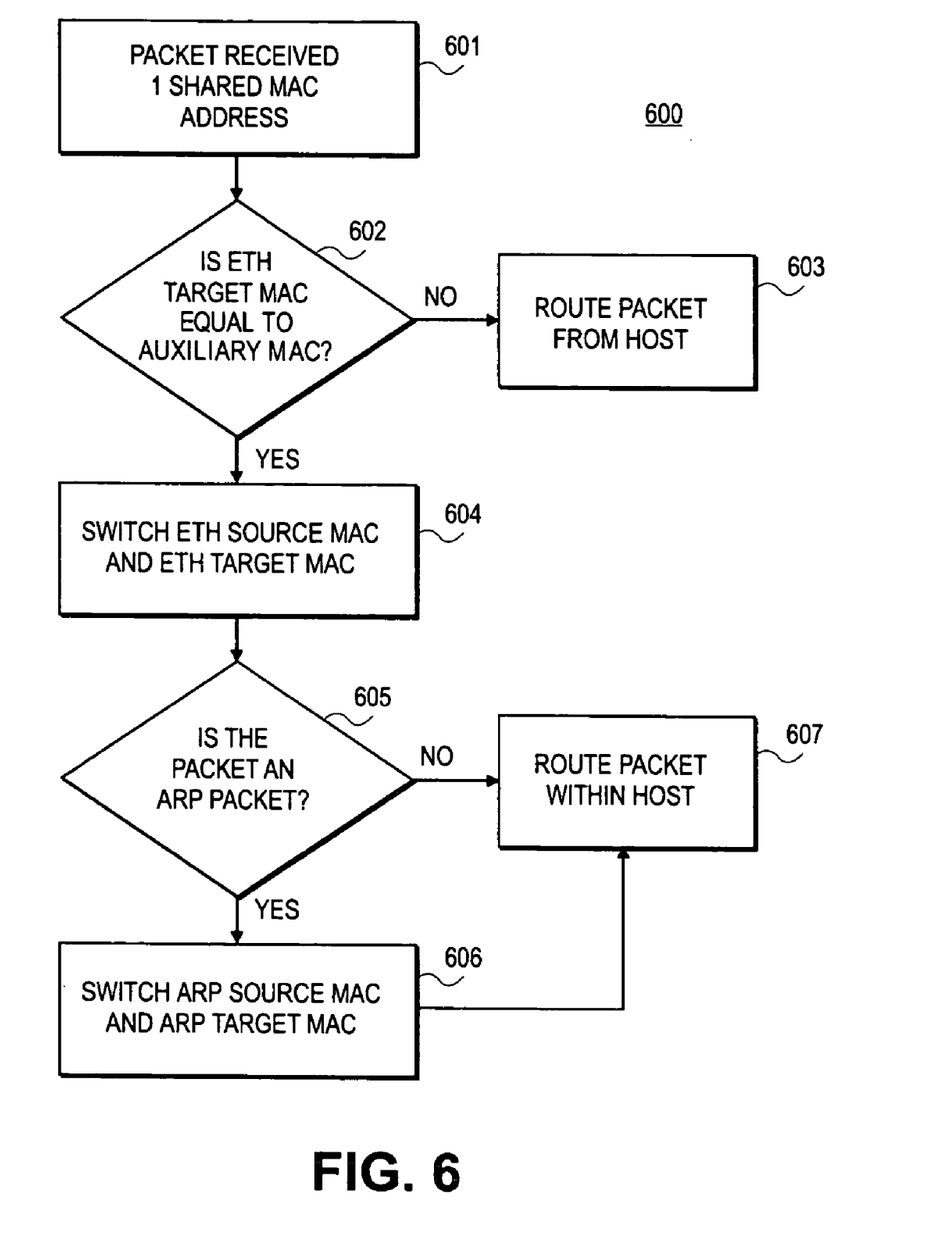
FIG. 6 is a flowchart illustrating the use of an auxiliary MAC address to prevent a loopback of data intended for transmission between entities residing on a single host.

FIG. 6 illustrates a flow diagram 600 for a method implementing one embodiment. In this example, the method may be performed by a NIC card of a host having multiple resident entities. At 601, a data packet may be received from one of the entities residing on the host, which shares a single MAC address with the other entities of the host. At 602, the data packet may be checked to see if a header includes an ETH target MAC field which contains the auxiliary MAC address shared by all of the entities. This indicates that the target of the data packet is another entity residing on the host. If the ETH target MAC field of the data packet header does not contain the auxiliary MAC address, the data packet may be routed from the host to a network destination external to the host, at 603. If the ETH target MAC field of the data packet header does contain the auxiliary MAC address, at 604, the ETH source MAC field and the ETH target MAC field of the data packet header may be switched.

Then at 605, the data packet may be checked to see if it is associated with ARP exchange—i.e. either an ARP request for a MAC address or a reply to such a request. If the data packet is not associated with an ARP exchange, at 607, the data packet may be routed within the host to a target host entity. If the data packet is associated with an ARP exchange, at 606, the ARP source MAC address and the ARP target MAC address of the data packet header may be switched. After switching the ARP source MAC address and the ARP target MAC address, at 607, the data packet may be routed within the host to a target host entity.

Figure 7:
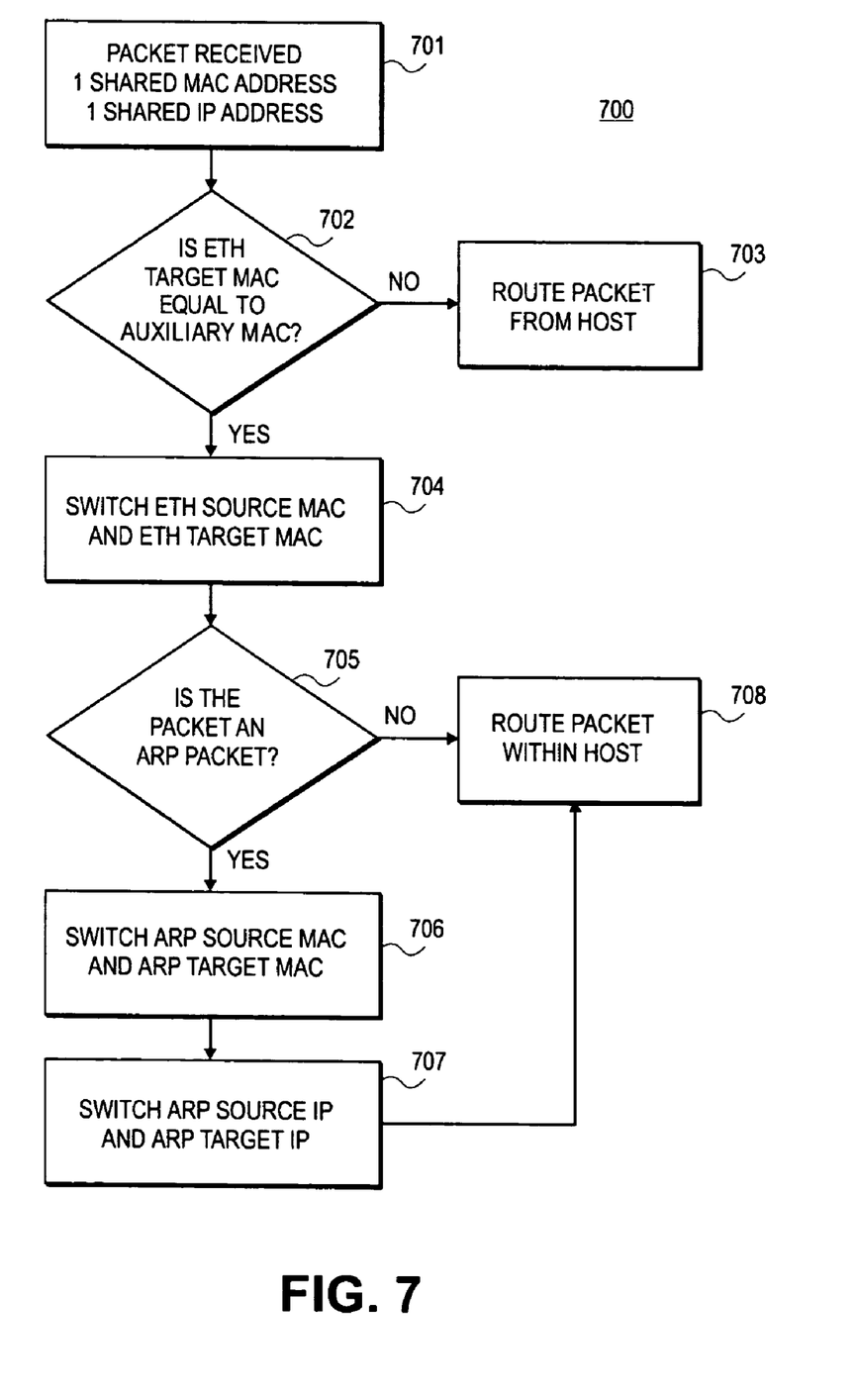
FIG. 7 is a flowchart illustrating the use of an auxiliary MAC address and an auxiliary IP address to prevent a loopback of data intended for transmission between entities residing on a single host.

FIG. 7 illustrates a flow diagram 700 for a method implementing another embodiment. In this example, the method may be performed by a NIC card of a host having multiple resident entities. At 701, a data packet may be received from one of the entities residing on the host, which shares both a single MAC address and a single IP address with the other entities of the host. At 702, the data packet may be checked to see if a header includes an ETH target MAC field which contains the auxiliary MAC address shared by all of the entities. This may indicate that the target of the data packet is another entity residing on the host. If the ETH target MAC field of the data packet header does not contain the auxiliary MAC address, the data packet may be routed from the host to a network destination external to the host, at 703. If the ETH target MAC field of the data packet header does contain the auxiliary MAC address, at 704, the ETH source MAC field and the ETH target MAC field of the data packet header may be switched.

Then at 705, the data packet may be checked to see if it is associated with ARP exchange—i.e. either an ARP request for a MAC address or a reply to such a request. If the data packet is not associated with an ARP exchange, at 708, the data packet may be routed within the host to a target host entity. If the data packet is associated with an ARP exchange, at 706, the ARP source MAC address and the ARP target MAC address of the data packet header may be switched.

In addition, at 707, the ARP source IP address and the ARP target IP address of the data packet header may be switched. After switching the ARP source and target MAC addresses as well as the ARP source and target IP addresses, at 708, the data packet is routed within the host to a target host entity.

Figure 8:
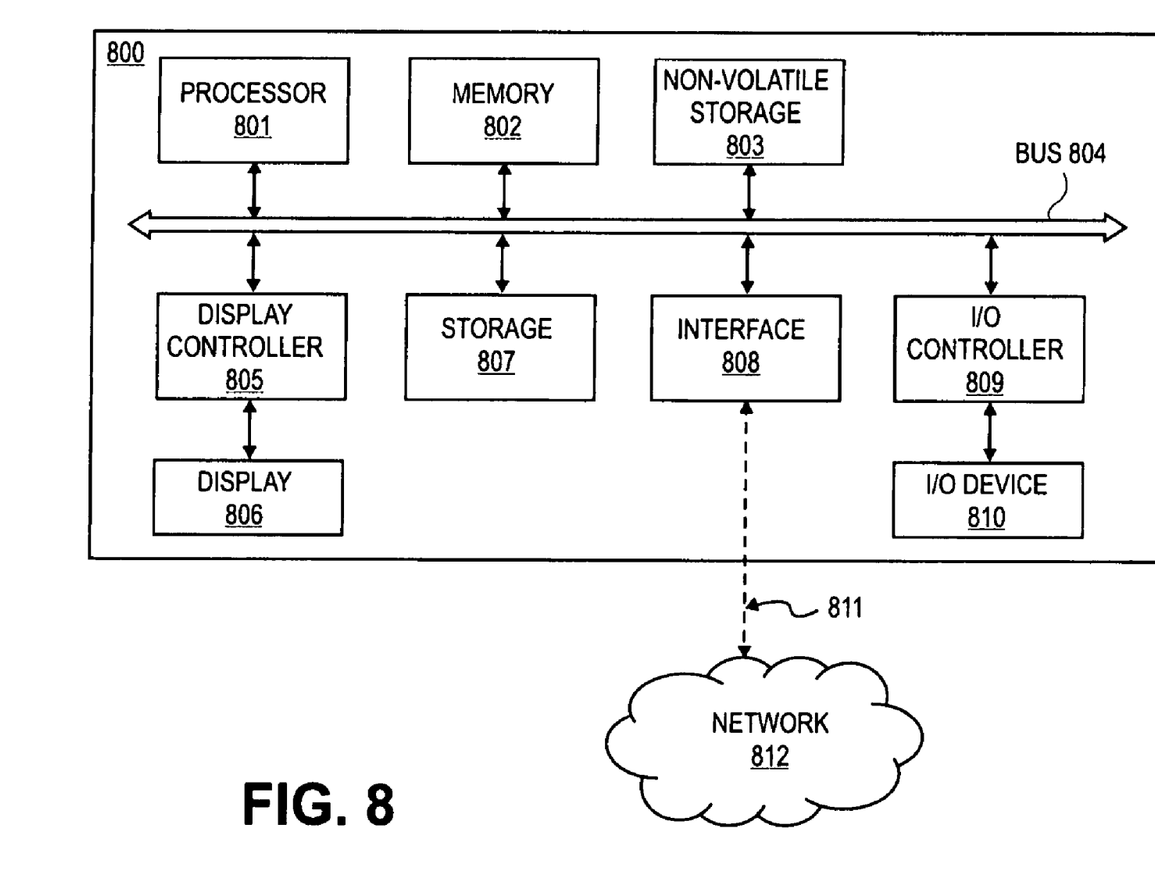
FIG. 8 is a schematic diagram illustrating one embodiment of a computer system in accordance with the teachings of the present invention.

FIG. 8 illustrates one embodiment of a computer system suitable for use with the invention. Computer system 800 may include a bus 804 or other communication device for communicating information and processor 801 coupled to bus 804 for processing information. While computer system 800 is illustrated with a single processor, computer system 800 may include multiple processors. Computer system 800 may further include a memory device 802 such as random access memory (RAM), coupled to bus 804 for storing information and instructions to be executed by processor 801. Memory 802 also can be used for storing temporary variables or other intermediate information during execution of instructions by processor 801. Computer system 800 also has, coupled to bus 804, non-volatile storage 803—e.g. read-only memory (ROM) or firmware—to store BIOS instructions or similar system software for processor 801. Other storage media 807 such as flash memory, a magnetic disk or optical disc and corresponding drives may be further coupled to bus 804 for storing information and instructions.

Computer system 800 can also have a display 806 such as a cathode ray tube (CRT) or liquid crystal display (LCD) coupled to bus 804 via a display controller 805, for displaying information to a computer user. Alphanumeric input/output (I/O) device 810, including alphanumeric and other keys, may also be coupled to bus 804 via an I/O controller 809. Computer system 800 may further include a network interface 808 that provides access to a network 812. In one embodiment, network interface 808 is a network interface card (NIC); however, other network interfaces can also be used.

One embodiment of the invention is related to the use of an auxiliary address to prevent loopback of data packets routed between entities residing on a host. According to one embodiment, loopback prevention via auxiliary addresses occurs in response to processor 801 executing sequences of instructions contained in memory 804. In alternative embodiments, hard-wired circuitry can be used in place of or in combination with software instructions to implement the invention. Thus, the invention is not limited to any specific combination of hardware circuitry and software instructions.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    sending, from a first entity residing on a host, a data packet having a networking source media access control (MAC) field and a networking target MAC field, wherein the first entity shares a single MAC address with a second entity residing on the host;
    making a first determination at the host that the networking target MAC field of the data packet contains an internal MAC address different from the single MAC address, the internal MAC address to indicate an entity residing on the host; and
    at the host, switching with one another contents of the source MAC field and contents of the target MAC field, the switching in response to the first determination.

2. The method of claim 1 wherein the first entity comprises a first virtual machine and the second entity comprises a second virtual machine.

3. The method of claim 1 wherein the first entity comprises a first operating system and the second entity comprises a second operating system.

4. The method of claim 1, the method further comprising:
    making a second determination that the data packet is an address resolution packet further having an address resolution source MAC field and an address resolution target MAC field; and
    placing the internal MAC address in the address resolution source MAC field, in response to the second determination.

5. The method of claim 4, wherein placing the internal MAC in the address resolution source MAC field comprises switching with one another contents of the address resolution source MAC field and contents of the address resolution target MAC field.

6. The method of claim 4, wherein the address resolution request is compliant with an Address Resolution Protocol (ARP).

7. The method of claim 4, wherein the first and second entities further share a single internet protocol (IP) address, the data packet further having an address resolution source IP field and an address resolution target IP field, further comprising:
    placing in the address resolution source IP field an internal IP address different from the shared IP address, in response to the second determination, the internal IP address to indicate an entity residing on the host.

8. The method of claim 7, wherein placing the internal MAC address in the address resolution source IP field comprises switching with one another contents of the address resolution source IP field and contents of the address resolution target IP field.

9. An apparatus comprising:
    a first operating entity resident on a host, the first operating entity to send a data packet having a networking source MAC field and a networking target MAC field;
    a second operating entity resident on the host, the second operating entity to receive the data packet, the second operating entity sharing a single MAC address with the first operating entity; and
    a networking device to make a first determination that the networking target MAC field of the data packet contains an internal MAC address different from the single MAC address, the internal MAC address to indicate an operating entity residing on the host, the networking device further to switch with one another contents of the networking source MAC field and contents of the networking target MAC field, the switching in response to the first determination.

10. The apparatus of claim 9, the networking device further to make a second determination that the data packet is an address resolution packet further having an address resolution source MAC field and an address resolution target MAC field, the networking device further to place the internal MAC address in the address resolution source MAC field, in response to the second determination.

11. The apparatus of claim 10, wherein placing the internal MAC address in the address resolution source MAC field comprises switching with one another contents of the address resolution source MAC field and contents of the address resolution target MAC field.

12. The apparatus of claim 10, wherein the address resolution request is compliant with an ARP.

13. The apparatus of claim 10, wherein the first and second operating entities further share a single internet protocol (IP) address, the data packet further having an address resolution source IP field and an address resolution target IP field, the networking device further to place in the address resolution source IP field an internal IP address different from the shared IP address, in response to the second determination, the internal IP address to indicate an operating entity residing on the host.

14. The apparatus of claim 13, wherein placing the internal MAC address in the address resolution source IP field comprises switching with one another contents of the address resolution source IP field and contents of the address resolution target IP field.

15. A system comprising:
    a shared dynamic random access memory (DRAM) to host a first operating entity and a second operating entity, the first operating entity to send a data packet having a networking source MAC field and a networking target MAC field, the second operating entity to receive the data packet, the second operating entity sharing a single MAC address with the first operating entity;
    a networking device to make a first determination that the networking target MAC field of the data packet contains an internal MAC address different from the single MAC address, the internal MAC address to indicate an operating entity hosted by the DRAM, the networking device further to switch with one another contents of the networking source MAC field and contents of the networking target MAC field, the switching in response to the first determination; and
    a bus connected with the first operating entity, the second operating entity, and the networking device, the bus to transmit the data packet.

16. The system of claim 15, the networking device further to make a second determination that the data packet is an address resolution packet further having an address resolution source MAC field and an address resolution target MAC field, the networking device further to place the internal MAC address in the address resolution source MAC field, in response to the second determination.

17. The system of claim 16, wherein placing the internal MAC address in the address resolution source MAC field comprises switching with one another contents of the address resolution source MAC field and contents of the address resolution target MAC field.

18. The system of claim 16, wherein the address resolution request is compliant with an ARP.

19. The system of claim 16, wherein the first and second operating entities further share a single internet protocol (IP) address, the data packet further having an address resolution source IP field and an address resolution target IP field, the networking device further to place in the address resolution source IP field an internal IP address different from the shared IP address, in response to the second determination, the internal IP address to indicate an operating entity hosted by the DRAM.

20. The system of claim 19, wherein placing the internal MAC address in the address resolution source IP field comprises switching with one another contents of the address resolution source IP field and contents of the address resolution target IP field.

21. A non-transitory machine-readable medium that provides instructions, which when executed by a set of one or more processors, cause said set of processors to perform a method comprising:
    sending from a first entity residing on a host a data packet comprising a source MAC field and a target MAC field, wherein the first entity shares a single MAC address with a second entity residing on the host;
    making a first determination at the host that the target MAC field of the data packet contains an internal MAC address different from the single MAC address, the internal MAC address to indicate an entity residing on the host;
    at the host, switching with one another contents of the source MAC field and contents of the target MAC field, the switching in response to the first determination; and
    receiving the data packet at the second entity.

22. The non-transitory machine-readable medium of claim 21, the method further comprising:
    making a second determination that the data packet is an address resolution packet further having an address resolution source MAC field and an address resolution target MAC field; and
    placing the internal MAC address in the address resolution source MAC field, in response to the second determination.

23. The non-transitory machine-readable medium of claim 22, wherein placing the internal MAC in the address resolution source MAC field comprises switching with one another contents of the address resolution source MAC field and contents of the address resolution target MAC field.

24. The non-transitory machine-readable medium of claim 22, wherein the address resolution request is compliant with an ARP.

25. The non-transitory machine-readable medium of claim 22, wherein the first and second entities further share a single internet protocol (IP) address, the data packet further having an address resolution source IP field and an address resolution target IP field, the method further comprising:
    placing in the address resolution source IP field an internal IP address different from the shared IP address, of in response to the second determination, the internal IP address to indicate an entity residing on the host.

26. The non-transitory machine-readable medium of claim 25, wherein placing the internal MAC address in the address resolution source IP field comprises switching with one another contents of the address resolution source IP field and contents of the address resolution target IP field.

* * * * *